United States Patent
Takahashi

(10) Patent No.: US 11,899,992 B2
(45) Date of Patent: Feb. 13, 2024

(54) PRINT DEVICE, PRINT QUALITY JUDGEMENT METHOD, AND NON-TRANSITORY COMPUTER-READABLE STORAGE MEDIUM

(71) Applicant: BROTHER KOGYO KABUSHIKI KAISHA, Nagoya (JP)

(72) Inventor: Hiroto Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/690,684

(22) Filed: Mar. 9, 2022

(65) Prior Publication Data
US 2022/0317938 A1    Oct. 6, 2022

(30) Foreign Application Priority Data
Mar. 30, 2021    (JP) ................................. 2021-057506

(51) Int. Cl.
G06F 3/12    (2006.01)

(52) U.S. Cl.
CPC ............ G06F 3/121 (2013.01); G06F 3/1243 (2013.01)

(58) Field of Classification Search
CPC .... G06F 3/1285; G06F 3/1259; G06F 3/1234; G06F 3/1243; G06F 3/121
See application file for complete search history.

(56) References Cited

U.S. PATENT DOCUMENTS

| 8,302,867 B2* | 11/2012 | Nakata | G06K 7/10811 |
| | | | 235/462.23 |
| 8,564,805 B2* | 10/2013 | Watanabe | G06F 3/1204 |
| | | | 358/1.15 |
| 2004/0057768 A1* | 3/2004 | Oshino | B41J 2/32 |
| | | | 400/103 |
| 2008/0019746 A1* | 1/2008 | Takiyama | G03G 21/046 |
| | | | 399/366 |

(Continued)

FOREIGN PATENT DOCUMENTS

| JP | S64-27970 A | 1/1989 |
| JP | S64-31281 A | 2/1989 |
| JP | H03-110186 A | 5/1991 |

(Continued)

*Primary Examiner* — John R Wallace
(74) *Attorney, Agent, or Firm* — KENEALY VAIDYA LLP

(57) ABSTRACT

A print device that includes a supply portion, a print portion, a conveyance portion, a notification portion, a processor, a reading portion, and a memory. The memory stores computer-readable instructions that, when executed by the processor, instruct the processor to perform processes including acquisition processing of acquiring judgment image data that does not satisfy a predetermined standard used to judge a print quality of a barcode, print processing of controlling the print portion to print a judgment image on a medium, judgment processing of judging whether read judgment image data output by the reading portion as a result of reading the judgment image satisfies the predetermined standard, and notification processing of controlling the notification portion to notify an error, when, in the judgment processing, it is judged that the read judgment image data satisfies the predetermined standard.

19 Claims, 12 Drawing Sheets

(56) References Cited

U.S. PATENT DOCUMENTS

2013/0153661 A1\* 6/2013 Yamaguchi .............. G06K 7/14
  235/462.06
2014/0035986 A1\* 2/2014 Adachi ...................... B41J 3/60
  283/74

FOREIGN PATENT DOCUMENTS

| JP | 2013-151126 A | 8/2013 |
| JP | 2017-007111 A | 1/2017 |

\* cited by examiner

FIG. 5

| | JUDGMENT ITEM | READING ORDER | MODIFICATION FACTOR |
|---|---|---|---|
| ONE-DIMENSIONAL BARCODE | SYMBOL CONTRAST | 1 | GRADATION DEFECT |
| | MINIMUM REFLECTANCE | | |
| | MINIMUM EDGE CONTRAST | 2 | ADDITION OF PARTIAL DAMAGE/ CONTAMINATION |
| | MODULATION | | |
| | DEFECT | | |
| | EASE OF DECODING | 3 | ADDITION OF LINE NON-UNIFORMITY |
| TWO-DIMENSIONAL CODE | SYMBOL CONTRAST | 1 | GRADATION DEFECT |
| | MODULATION | 2 | ADDITION OF PARTIAL DAMAGE/ CONTAMINATION |
| | REFLECTANCE TOLERANCE | | |
| | FIXED PATTERN DAMAGE | | |
| | NON-UNIFORMITY OF AXES | 3 | ADDITION OF POSITIONAL DISPLACEMENT |
| | NON-UNIFORMITY OF LATTICE | | |
| | UNUSED ERROR CORRECTION | - | - |

PRINT DEVICE, PRINT QUALITY JUDGEMENT METHOD, AND NON-TRANSITORY COMPUTER-READABLE STORAGE MEDIUM

CROSS REFERENCE TO RELATED APPLICATIONS

This application claims priority to Japanese Patent Application No. 2021-057506 filed Mar. 30, 2021, the content of which is hereby incorporated herein by reference in its entirety.

BACKGROUND

The present disclosure relates to a print device, a print quality judgment method, and a non-transitory computer-readable storage medium.

In known art, a print device that prints an image on a long medium reads an image that has been printed, after printing a barcode, and determines whether the read image matches an image that should have been printed. When read image information does not match image information that should have been printed, the print device prints a defect marker and performs error notification.

SUMMARY

With the print device that performs the determination of the print quality of the barcode, as in the known art, when there is not contamination or the like inside the print device, a determination is made that the print quality of all the barcodes satisfies a predetermined standard, and a user of the print device cannot determine whether the determination of the print quality of the barcodes is being performed appropriately.

Embodiments of the broad principles derived herein provide a print device, a print quality judgment method, and a non-transitory computer-readable storage medium with which a user of the print device can determine whether a judgment of print quality of a printed barcode is being performed appropriately.

Embodiments provide a print device that includes a supply portion, a print portion, a conveyance portion, a notification portion, a processor, a reading portion, and a memory. The supply portion is configured to supply a long medium. The print portion is configured to print an image on the medium fed out from the supply portion. The conveyance portion is configured to convey the medium in a conveyance direction from the supply portion toward the print portion. The processor is configured to control the print portion, and the notification portion. The reading portion is configured to read the image printed by the print portion and to output read image data to the processor. The memory stores computer-readable instructions that, when executed by the processor, instruct the processor to perform processes. The processes include acquisition processing of acquiring judgment image data that does not satisfy a predetermined standard used to judge a print quality of a barcode, print processing of controlling the print portion, based on the judgment image data, to print a judgment image on the medium, judgment processing of judging whether read judgment image data output by the reading portion as a result of reading the judgment image satisfies the predetermined standard, and notification processing of controlling the notification portion to notify an error, when, in the judgment processing, it is judged that the read judgment image data satisfies the predetermined standard. The print device controls the notification portion and notifies the error when it is judged that the read judgment image data satisfies the predetermined standard used to judge the print quality of the barcode. Thus, on the basis of whether it is possible to appropriately judge the print quality of the judgment image, the print device contributes to notifying a user of the print device whether the judgment of the print quality of the printed barcode is being appropriately performed.

Embodiments also provide a print quality judgment method performed by a processor of a print device. The method includes an acquisition process of acquiring judgment image data that does not satisfy a predetermined standard used to judge a print quality of a barcode printed by the print device. The print device includes a supply portion, a print portion, a conveyance portion, a notification portion, and a reading portion. The supply portion is configured to supply a long medium. The print portion is configured to print an image on the medium fed out from the supply portion. The conveyance portion is configured to convey the medium in a conveyance direction from the supply portion toward the print portion. The reading portion is configured to read the image printed by the print portion and to output read image data to the processor. The method includes a print process of controlling the print portion, based on the judgment image data, to print a judgment image on the medium, a judgment process of judging whether read judgment image data output by the reading portion as a result of reading the judgment image satisfies the predetermined standard, and a notification process of controlling the notification portion to notify an error, when, in the judgment process, it is judged that the read judgment image data satisfies the predetermined standard. When the print quality judgment method is performed by the processor of the print device, the print device controls the notification portion and notifies the error when it is judged that the read judgment image data satisfies the predetermined standard used to judge the print quality of the barcode. Thus, on the basis of whether it is possible to appropriately judge the print quality of the judgment image, the print device contributes to notifying a user of the print device whether the judgment of the print quality of the printed barcode is being appropriately performed.

Embodiments further provide a non-transitory computer-readable storage medium that stores computer-readable instructions that are executed by a processor of a print device, the computer-readable instructions performing processes. The processes include acquisition processing of acquiring judgment image data that does not satisfy a predetermined standard used to judge a print quality of a barcode printed by the print device. The print device includes a supply portion, a print portion, a conveyance portion, a notification portion, and a reading portion. The supply portion is configured to supply a long medium. The print portion is configured to print an image on the medium fed out from the supply portion. The conveyance portion is configured to convey the medium in a conveyance direction from the supply portion toward the print portion. The reading portion is configured to read the image printed by the print portion and to output read image data to the processor. The processes includes print processing of controlling the print portion, based on the judgment image data, to print a judgment image on the medium, judgment processing of judging whether read judgment image data output by the reading portion as a result of reading the judgment image satisfies the predetermined standard, and notification processing of controlling the notification portion to notify an error, when, in the judgment processing, it is judged that the read judgment image data satisfies the predetermined standard. When the instructions stored in the non-transitory computer-readable storage medium are executed by the processor of the print device, the print device controls the notification portion and notifies the error when it is judged that the read judgment image data satisfies the predetermined standard used to judge the print quality of the barcode. Thus, on the basis of whether it is possible to appropriately judge the print quality of the judgment image, the print device contributes to notifying a user of the print device whether the judgment of the print quality of the printed barcode is being appropriately performed.

BRIEF DESCRIPTION OF THE DRAWINGS

Embodiments will be described below in detail with reference to the accompanying drawings in which:

FIG. 5 is an explanatory diagram of a table;

DETAILED DESCRIPTION

Figure 1:
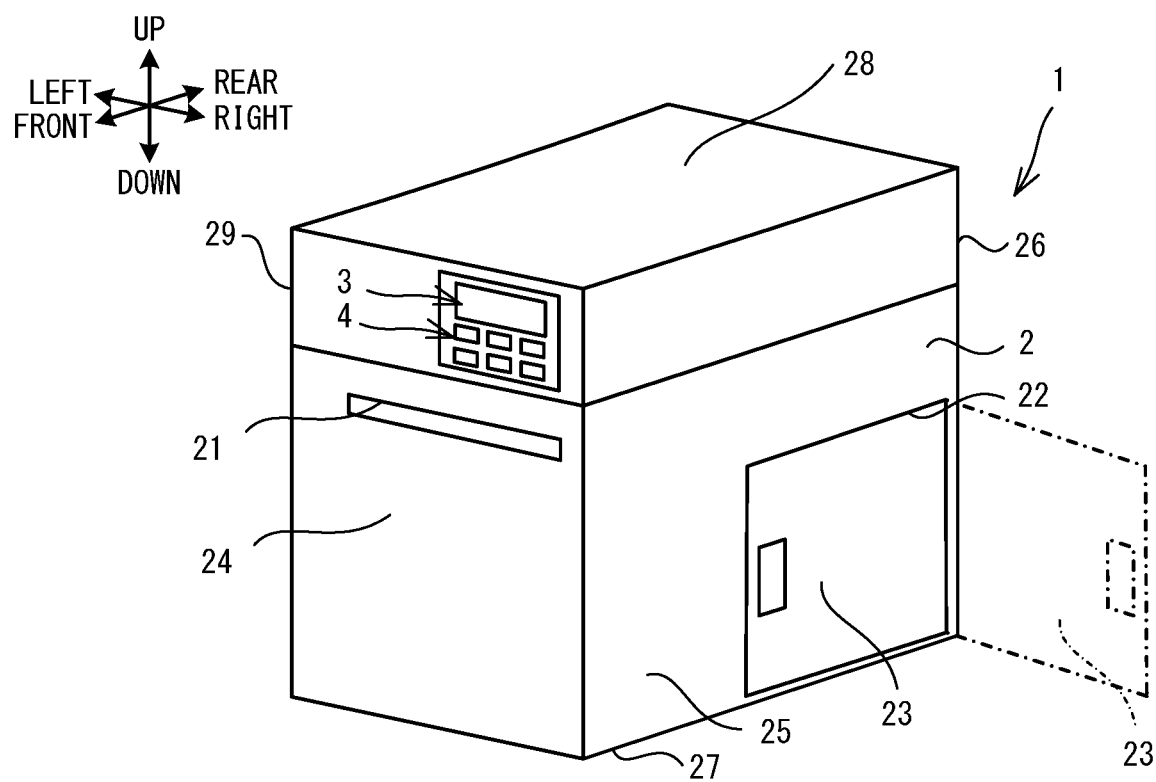
FIG. 1 is a perspective view of a print device.

A print device 1 according to an embodiment of the present disclosure will be described with reference to the drawings. The drawings that are referenced are used to illustrate the technical characteristics that can be employed by the present disclosure. The configurations and the like of the devices that are described are not intended to be limited thereto, but are merely illustrative examples. In the description of the present embodiment, the left lower side, the right upper side, the right lower side, the left upper side, the upper side, and the lower side in FIG. 1 are, respectively, the front side, the rear side, the right side, the left side, the upper side, and the lower side of the print device 1.

A physical configuration of the print device 1 will be described with reference to FIG. 1 and FIG. 2. As illustrated in FIG. 1, the print device 1 is provided with a housing 2, a display portion 3, and an operation portion 4. The housing 2 includes a front wall 24, a right wall 25, a rear wall 26, a left wall 29, a lower wall 27, an upper wall 28, and a cover 23. The housing 2 is a cuboid shape of a size that can be placed on a table. A discharge opening 21 and an opening 22 are formed in the housing 2. The discharge opening 21 is formed in a rectangular shape that is long in the left-right direction in a front view, in the front wall 24 of the housing 2. The opening 22 is formed in a rectangular shape in a right side view, in a rear lower portion of the right wall 25 of the housing 2. The cover 23 is a plate having a rectangular shape in a right side view, and is supported at a rear lower portion of the right side surface of the housing 2 such that the cover 23 can rotate between a closed position (illustrated using a solid line in FIG. 1) in which the opening 22 is closed, and an open position (illustrated using an alternate long and short dash line in FIG. 1) in which the opening 22 is open. The display portion 3 is provided at an upper right portion in the front surface of the front wall 24 of the housing 2, and displays an image. The operation portion 4 is provided below the display portion 3, of the upper right portion of the front surface of the front wall 24 of the housing 2, and is configured by a plurality of buttons used to input various commands. The display portion 3 and the operation portion 4 are provided above the discharge opening 21.

Figure 2:
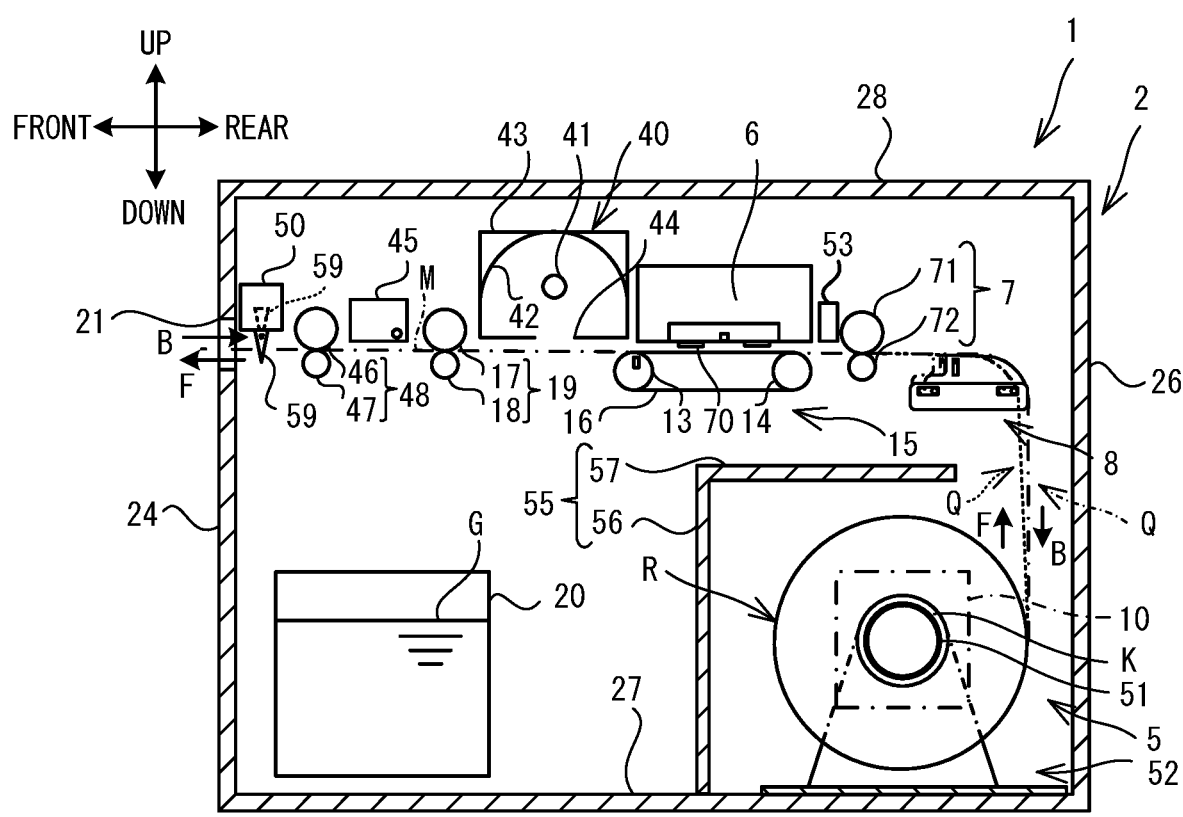
FIG. 2 is a cross-sectional view illustrating an internal configuration of the print device.

As illustrated in FIG. 2, the print device 1 houses, inside the housing 2, a supply portion 5, conveyance portions 7, 10, 15, 19, and 48, a partition wall 55, a tension applying portion 8, a medium detection portion 53, a print portion 6, a fixing unit 40, a reading portion 45, and a cutting portion 50. The print device 1 is an inkjet printer configured to perform printing on a medium M. The medium M is a long medium wound in a roll shape on a tubular paper tube K, for example. The supply portion 5 is provided to the left of the cover 23 that is in the closed position illustrated by the solid line in FIG. 1, and in a space in a rear lower portion of the print device 1 surrounded by the partition wall 55 and the rear wall 26 illustrated in FIG. 2. The supply portion 5 holds a roll R. The roll R is a roll on which the medium M is wound in the roll shape. The supply portion 5 of the present embodiment is provided with a shaft portion 51 and a magazine 52. The shaft portion 51 extends in the left-right direction, and is inserted through the paper tube K of the roll R. The magazine 52 is a support base having a U-shape in a front view. The magazine 52 supports both left and right ends of the shaft portion 51 such that the shaft portion 51 can rotate around an axis extending in the left-right direction. The shaft portion 51 is detachably supported by the magazine 52. The magazine 52 is detachably supported by the print device 1. When a user of the print device 1 replaces the roll R, the user disposes the cover 23 in the open position illustrated in FIG. 1, detaches the magazine 52 illustrated in FIG. 2 from inside the housing 2, and performs the replacement operation of the roll R. The partition wall 55 includes a first wall portion 56 extending upward from the lower wall 27 of the housing 2, and a second wall portion 57 extending to the rear from the upper end of the first wall portion 56, and partitions the internal space of the housing 2. The second wall portion 57 is separated from the rear wall 26 of the housing 2 in the front-rear direction.

The print portion 6 prints an image on the medium M supplied from the supply portion 5. The print portion 6 of the present embodiment is provided with a plurality of nozzles 70 that discharge a liquid G in a discharge direction, and is an inkjet head that performs the printing of the image on the medium M by discharging the liquid G from the plurality of nozzles 70. The discharge direction of the present embodiment is the downward direction, and the print portion 6 is provided in a posture in which the plurality of nozzles 70 are oriented downward, above a conveyance path Q of the medium M. The conveyance path Q is a path along which the medium M fed out from the supply portion 5 is conveyed until the medium M is discharged to the outside of the housing 2 from the discharge opening 21. The liquid G is supplied to the print portion 6, via a tube that is not illustrated, from a tank 20 disposed inside the housing 2.

The conveyance portion 7 conveys the medium M in a conveyance direction F from the supply portion 5 to the print portion 6, and in return direction B that is the opposite direction to the conveyance direction F. The conveyance direction F is a direction along the conveyance path Q from the supply portion 5 toward the print portion 6. The conveyance direction F is a direction intersecting the left-right direction that is an extending direction of the rotation axis of the roll R, and is a direction that changes in accordance with the position on the conveyance path Q. The conveyance direction F from the supply portion 5 to the tension applying portion 8 is a direction that changes in accordance with a remaining amount of the medium M, and when the remaining amount of the medium M is an initial value, that is, the remaining amount immediately after the replacement of the roll R, as illustrated in FIG. 2, the conveyance direction F is substantially upward. The conveyance direction F from the tension applying portion 8 to the discharge opening 21 is substantially to the front. In other words, in the print device 1, at a section at which the medium M comes into contact with the tension applying portion 8, the conveyance path Q bends, and the conveyance direction F changes from upward toward the front.

The conveyance portion 7 is provided upstream of the print portion 6 in the conveyance direction, and downstream of the supply portion 5 in the conveyance direction. In other words, the conveyance portion 7 is provided between the print portion 6 and the supply portion 5, on the conveyance path Q of the medium M. The conveyance portion 7 of the present embodiment includes a conveyance roller 71 and a pinch roller 72 that rotate around axes extending in the left-right direction, and nips and conveys the medium M by sandwiching the medium M from above and below between the conveyance roller 71 and the pinch roller 72.

Figure 3:
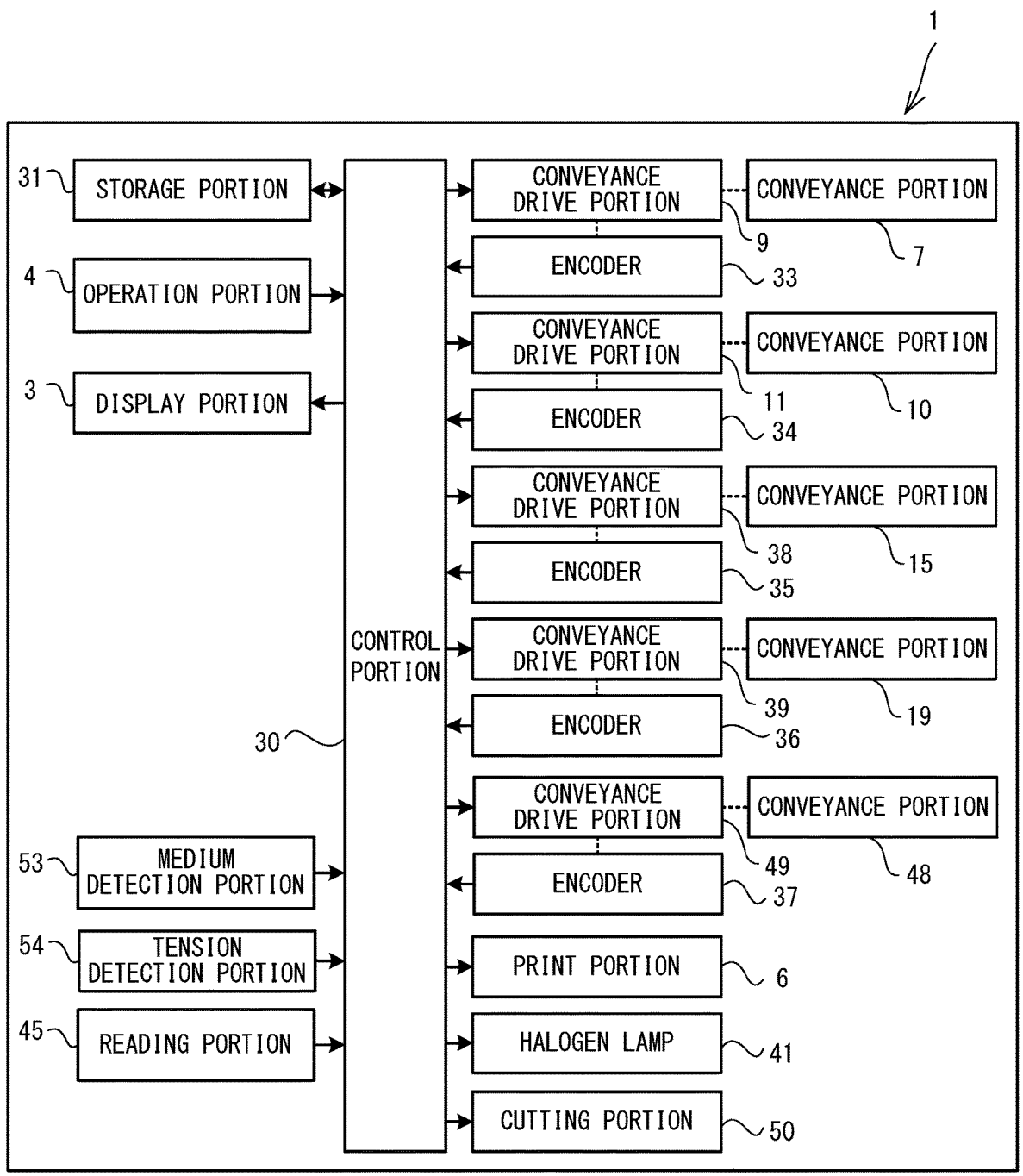
FIG. 3 is a block diagram illustrating an electrical configuration of the print device.

The medium detection portion 53 outputs a detection result of the medium M to a control portion 30 illustrated in FIG. 3. The medium detection portion 53 of the present embodiment is a transmission type sensor or a reflection type sensor. When the medium detection portion 53 is the reflection type sensor, for example, the medium detection portion 53 detects a leading end of a label M2, using a difference in reflectivity between a base sheet M1 and the label M2. The base sheet M1 is provided with a plurality of holes provided in rows at a predetermined interval in the conveyance direction F, and, when the medium detection portion 53 is the transmission type sensor, for example, the medium detection portion 53 detects the leading end of the label M2 on the basis of whether or not light passes through the plurality of holes in the base sheet M1.

The conveyance portion 10 is provided downstream of the conveyance portion 7 in the conveyance direction, and conveys the medium M in the conveyance direction F and the return direction B. The conveyance portion 10 of the present embodiment rotates the roll R held by the supply portion 5, conveys the medium M in the return direction B, and winds the medium M onto the roll R. The conveyance portion 10 of the present embodiment detachably engages with the shaft portion 51 of the supply portion 5. The conveyance portion 10 rotates the roll R held by the supply portion 5, conveys the medium M in the conveyance direction F, and feeds out the medium M from the roll R toward the print portion 6.

The tension applying portion 8 applies a tension to the medium M on the conveyance path Q, between the supply portion 5 and the conveyance portion 7. The tension is a tension that acts in the reverse direction to a progress direction of the medium M. The tension applying portion 8 is disposed downstream of the conveyance portion 7 in the conveyance direction, and upstream of the conveyance portion 10 in the conveyance direction. The tension applying portion 8 is in contact with the medium M and urges the medium M in a direction intersecting the conveyance direction F. In other words, the tension applying portion 8 is provided between the conveyance portion 7 and the conveyance portion 10 on the conveyance path Q. The tension applying portion 8 is provided to the rear of the conveyance portion 7 and above the supply portion 5.

The conveyance portion 15 is provided below the print portion 6, and downstream of the conveyance portion 7 in the conveyance direction, and conveys the medium M in the conveyance direction F. The conveyance portion 15 is provided with a drive roller 13, a driven roller 14, and an endless belt 16. The drive roller 13 and the driven roller 14 are separated from each other in the front-rear direction. The endless belt 16 is stretched between the drive roller 13 and the driven roller 14. The driven roller 14 rotates in accordance with the rotation of the endless belt 16. The upper end on an outer peripheral surface of the endless belt 16 is in substantially the same position, in the up-down direction, as the section of the medium M that is nipped by the conveyance portion 7, and faces the plurality of nozzles 70 of the print portion 6. In the conveyance direction F, the upper end on the outer peripheral surface of the endless belt 16 supports and conveys, from below, the medium M conveyed between the conveyance portion 7 and the conveyance portion 19, in a state of sucking the medium M against the endless belt 16 using static electricity or a negative pressure.

The fixing unit 40 is disposed downstream of the print portion 6 in the conveyance direction, and upstream of the conveyance portion 19 in the conveyance direction. The fixing unit 40 is a halogen heater and includes a halogen lamp 41, a reflective plate 42, and a housing 43. An opening 44 in the left-right direction is formed in a lower wall of the housing 43. The fixing unit 40 radiates infrared rays through the opening 44, and heats the medium M passing directly below the opening 44. In this way, the liquid G discharged by the print portion 6 onto the medium M is fixed to the medium M.

The conveyance portion 19 is provided downstream of the print portion 6 and the fixing unit 40 in the conveyance direction, and upstream of the reading portion 45, the cutting portion 50, and the discharge opening 21 in the conveyance direction. The conveyance portion 19 conveys the medium M in the conveyance direction F and the return direction B. The conveyance portion 19 includes a conveyance roller 17 and a pinch roller 18 that rotate around axes extending in the left-right direction, and nips and conveys the medium M by sandwiching the medium M from above and below between the conveyance roller 17 and the pinch roller 18.

The reading portion 45 is provided downstream of the print portion 6 and the conveyance portion 19 in the conveyance direction, and upstream of the cutting portion 50 and the discharge opening 21 in the conveyance direction. The reading portion 45 is positioned directly above the conveyance path Q. The reading portion 45 optically reads an image printed on the surface of the label M2 of the medium M, and outputs an image signal representing the read image. The reading portion 45 is, for example, a line image sensor, such as a contact image sensor (CIS) that is long in the width direction of the medium M, that is, in the left-right direction.

The conveyance portion 48 is provided downstream of the reading portion 45 in the conveyance direction, and upstream of the cutting portion 50 and the discharge opening 21 in the conveyance direction. The conveyance portion 48 conveys the medium M in the conveyance direction F and the return direction B. The conveyance portion 48 includes a conveyance roller 46 and a pinch roller 47 that rotate around axes extending in the left-right direction. The conveyance portion 48 nips and conveys the medium M by sandwiching the medium M from above and below between the conveyance roller 46 and the pinch roller 47.

The cutting portion 50 is provided downstream of the reading portion 45 and the conveyance portion 48 in the conveyance direction, and upstream of the discharge opening 21 in the conveyance direction. The cutting portion 50 is positioned directly above the conveyance path Q. The cutting portion 50 includes a blade 59 that extends downward. The blade 59 can move between a cutting position and a stand-by position, and cuts the medium M on the conveyance path Q at a position immediately to the rear of the discharge opening 21. As illustrated by a solid line in FIG. 2, the cutting position is a position at which the blade 59 intersects the conveyance path Q. As illustrated by a dotted line in FIG. 2, the stand-by position is a position at which the blade 59 is separated from the conveyance path Q, and is disposed directly above the conveyance path Q.

The electrical configuration of the print device 1 will be described with reference to FIG. 3. The print device 1 is provided with the control portion 30, and with a storage portion 31, the operation portion 4, the display portion 3, conveyance drive portions 9, 11, 38, 39, and 49, the print portion 6, the halogen lamp 41, encoders 33 to 37, the medium detection portion 53, a tension detection portion 54, the reading portion 45, and the cutting portion 50, which are electrically connected to the control portion 30. The control portion 30 controls the print device 1, and controls the print portion 6, the halogen lamp 41, the conveyance drive portions 9, 11, 38, 39, and 49, the display portion 3, and the cutting portion 50. The storage portion 31 includes a ROM, a RAM, a flash memory, and the like that store various parameters and the like necessary when the control portion 30 executes various programs.

The conveyance drive portion 9 rotationally drives the conveyance portion 7 under the control of the control portion 30. The conveyance drive portion 11 rotationally drives the conveyance portion 10 under the control of the control portion 30. Under the control of the control portion 30, the conveyance drive portion 38 rotates the endless belt 16 of the conveyance portion 15, by rotating the drive roller 13 of the conveyance portion 15. The conveyance drive portion 39 rotationally drives the conveyance portion 19 under the control of the control portion 30. The conveyance drive portion 49 rotationally drives the conveyance portion 48 under the control of the control portion 30. Each of the conveyance drive portions 9, 11, 38, 39, and 49 is a stepping motor that can perform forward and reverse rotation, for example. The encoder 33 inputs a value, to the control portion 30, in accordance with a drive amount of the conveyance drive portion 9. The encoder 34 inputs a value, to the control portion 30, in accordance with a drive amount of the conveyance drive portion 11. The encoder 35 inputs a value, to the control portion 30, in accordance with a drive amount of the conveyance drive portion 38. The encoder 36 inputs a value, to the control portion 30, in accordance with a drive amount of the conveyance drive portion 39. The encoder 37 inputs a value, to the control portion 30, in accordance with a drive amount of the conveyance drive portion 49. The tension detection portion 54 outputs, to the control portion 30, a detection result in accordance with the tension applied by the tension applying portion 8 to the medium M between the tension applying portion 8 and the conveyance portion 7.

Figure 4:
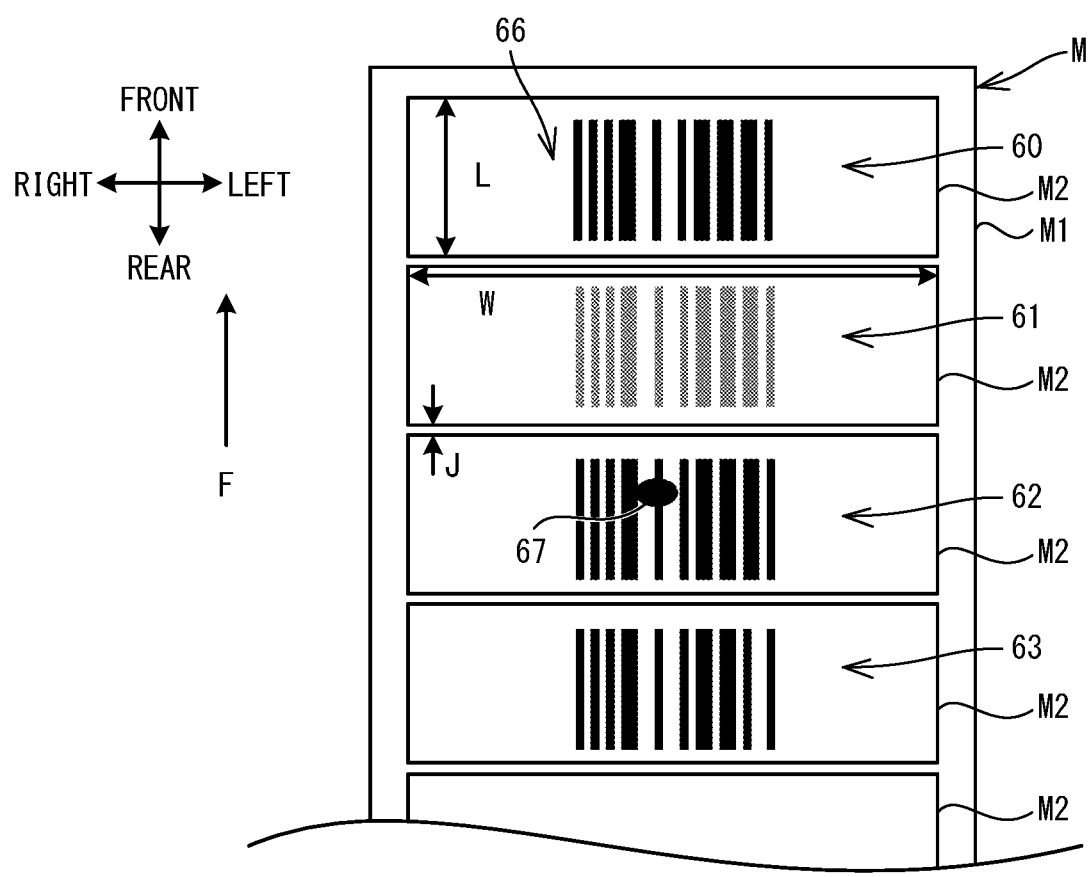
FIG. 4 is an explanatory diagram of a reference image including a one-dimensional barcode of a first specific example, and judgment images, which are all printed on a medium.

The configuration of the medium M will be described with reference to FIG. 4. As illustrated in FIG. 4, the medium M includes the long base sheet M1 and the plurality of labels M2 attached to the base sheet M1. Each of the labels M2 is a rectangular shape whose length in a lengthwise direction is a length L and whose length in the width direction orthogonal to the lengthwise direction is a width W. The plurality of labels M2 are adhered at equal intervals to the base sheet M1 in the conveyance direction F at an interval J.

The table 79 stored in the storage portion 31 will be described with reference to FIG. 5. As illustrated in FIG. 5, the table 79 stores correspondences between a type of barcode, a judgment item, and a modification factor. The judgment item is an item set in order to judge whether read image data that is output after reading a printed barcode satisfies a predetermined standard, which is used to judge the print quality of the barcode. The table 79 stores the judgment items used to judge the print quality of the barcode, for each of the types of barcode. The types of barcode of the present embodiment are two types, namely, a one-dimensional barcode and a two-dimensional code. When the reference barcode is the one-dimensional barcode, there are six judgment items, which are symbol contrast, minimum reflectance, minimum edge contrast, modulation, defect, and ease of decoding. When the reference barcode is the two-dimensional code, there are seven judgment items, which are symbol contrast, modulation, reflectance margin, fixed pattern damage, non-uniformity of axes, non-uniformity of lattice, and not yet used error correction. The modification factors indicate modifications to be added to the reference image data for determining whether the print device 1 has been able to appropriately determine the read image data for each of the judgment items. The table 79 stores the modification factors in association with a reading order. When the barcode is the one-dimensional barcode, there are three modification factors, which are gradation defect, addition of partial damage/contamination, and addition of line non-uniformity. When the barcode is the two-dimensional code, there are three modification factors, which are gradation defect, addition of partial damage/contamination, and addition of positional displacement.

Print quality judgment processing performed by the control portion 30 of the print device 1 will be described with reference to FIG. 4 to FIG. 7, using a first specific example of printing a reference image 60 illustrated in FIG. 4, and a second specific example of printing a reference image 90 illustrated in FIG. 7. The print quality judgment processing is performed when a command has been detected, in the print device 1, to perform the print quality judgment processing. The command includes an instruction to perform the print quality judgment processing, the print data, and a command to perform print processing on the basis of the print data. In the following description, each of steps of the processing are denoted by the abbreviation "S". At the time of the print quality judgment processing, the medium M is sandwiched by the conveyance portion 7, and attributes of the medium M are input to the print device 1 by the user. The print quality judgment processing of the first specific example and the print quality judgment processing of the second specific example are performed at mutually different timings, but, in order to simplify the explanation, the print quality judgment processing of the first specific example and the print quality judgment processing of the second specific example will be described in parallel.

Figure 6:
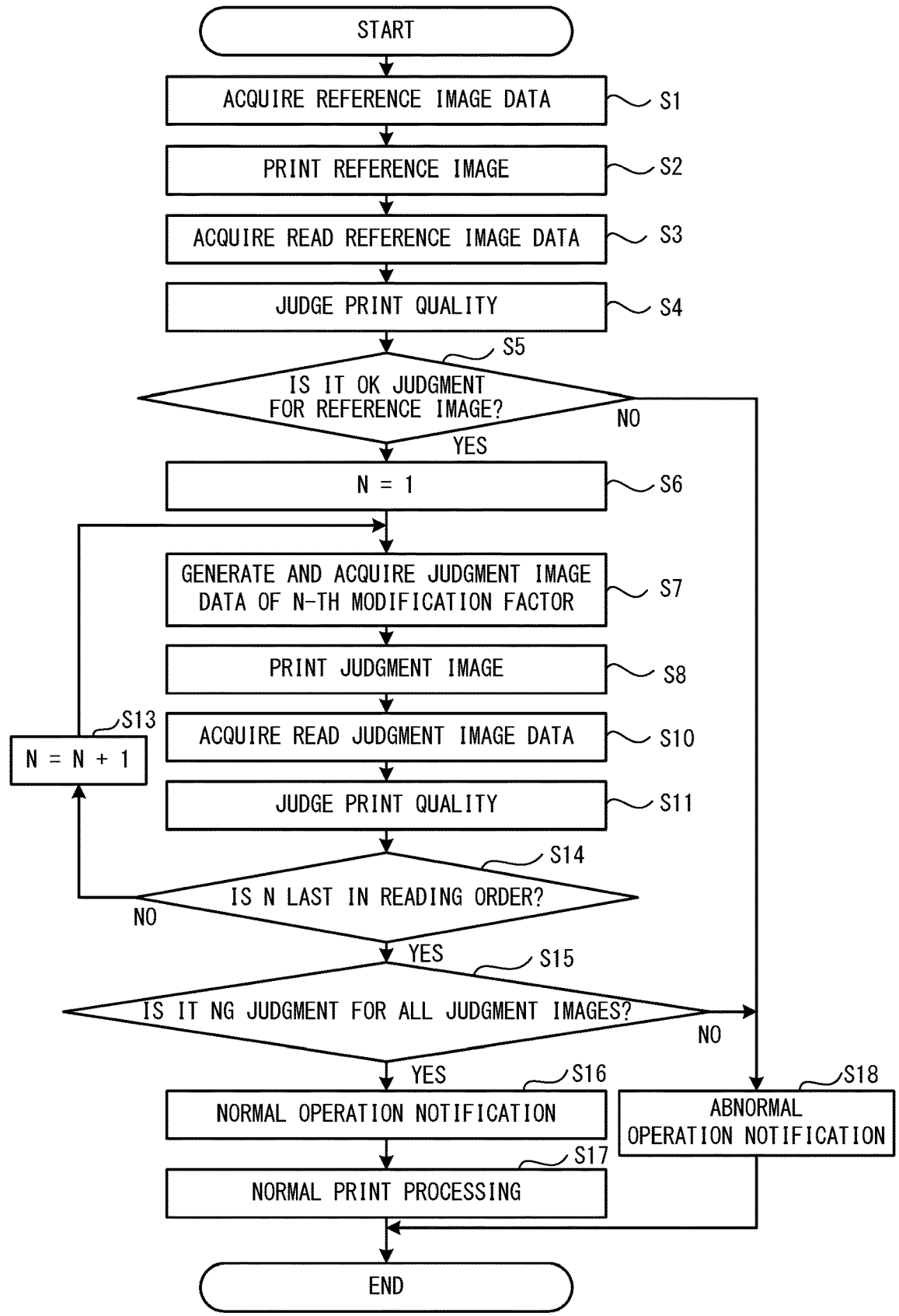
FIG. 6 is a flowchart of print quality judgment processing.
Figure 7:
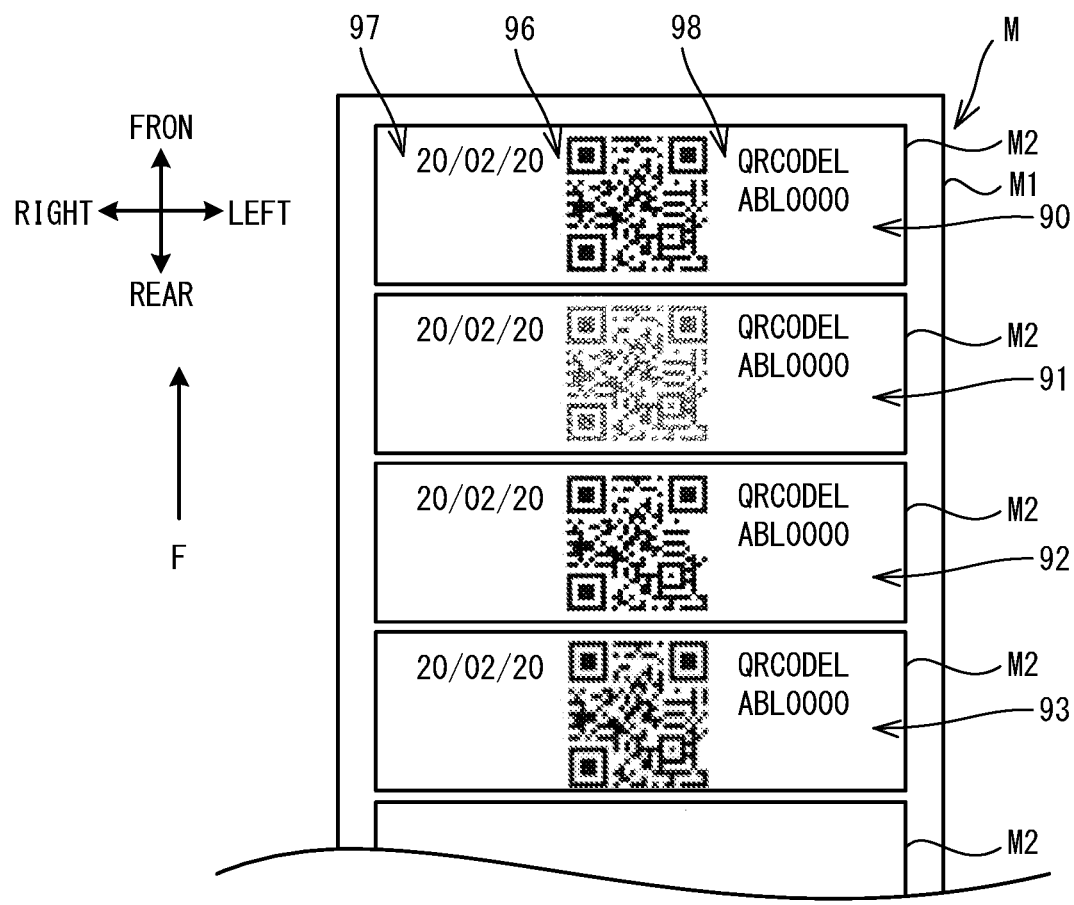
FIG. 7 is an explanatory diagram of a reference image including a two-dimensional code of a second specific example, and judgment images, which are all printed on the medium.

As illustrated in FIG. 6, the control portion 30 acquires reference image data (S1). The reference image data is data used in printing the reference barcode. The reference barcode is a barcode used to judge the print quality. The reference image data of the first specific example is data stored in advance in the storage portion 31, for judging the print quality. In the first specific example, the reference image data of the reference image 60, which is stored in advance in the storage portion 31, is acquired when the reference barcode is a one-dimensional barcode 66. The reference image 60 includes the one-dimensional barcode 66. The reference image data of the second specific example is data used in print processing specified by the user. In the second specific example, reference image data of the reference image 90 is acquired where the reference barcode is a two-dimensional code 96 input as the print data. The reference image 90 includes the two-dimensional code 96, and character strings 97 and 98. The character string 97 is disposed to the right of the two-dimensional code 96. The character string 98 is disposed to the left of the two-dimensional code 96.

The control portion 30 controls the print portion 6, conveyance drive portions 9, 11, 38, 39, and 49, and the halogen lamp 41 on the basis of the reference image data acquired at S1, and prints the reference image on the medium M on the basis of the reference image data acquired at S1 (S2). In the first specific example, the reference image 60 is printed on the label M2, and in the second specific example, the reference image 90 is printed on the label M2. The control portion 30 controls the conveyance drive portions 9, 11, 38, 39, and 49, conveys the label M2 on which the reference image has been printed to a position below the reading portion 45, and acquires read reference image data output as a result of the reference image being read by the reading portion 45 (S3).

The control portion 30 judges whether the read reference image data acquired at S3 satisfies the predetermined standard used in judging the print quality of the barcode (S4). The control portion 30 of the present examples determines whether the predetermined standard is satisfied, in accordance with the type of the reference barcode, for each of the judgment items stored in the table 79 illustrated in FIG. 5. The control portion 30 stores an OK judgment when all the judgment items satisfy the predetermined standard, and stores an NG judgment when at least one of the items does not satisfy the predetermined standard. In the first and second specific examples, as a read reference image data judgment result, the control portion 30 stores the OK judgment indicating that the predetermined standard is satisfied.

The control portion 30 determines whether the judgment result at S4 is the OK judgment (S5). In other words, the control portion 30 determines whether it is the OK judgment indicating that the read reference image data satisfies the predetermined standard. When the judgment result at S4 is not the OK judgment (no at S5), the control portion 30 performs processing at step S18 to be described later. The judgment result for the read reference image data of the reference image 60 of the first specific example and for the read reference image data of the reference image 90 of the second specific example is the OK judgment in each case (yes at S5), and thus, the control portion 30 performs processing from S6 to S15, which judges whether the NG judgment can be issued to the read image data that does not satisfy the predetermined standard. Specifically, the control portion 30 sets 1 as a variable N for reading, in order, the modification factor stored in the table 79 (S6). The control portion 30 applies the modification of the N-th modification factor in the reading order to the reference image data acquired at S1, generates judgment image data, and acquires the generated judgment image data (S7). When the reference barcode is the one-dimensional barcode, the control portion 30 acquires the judgment image data by applying, to the reference image data, one of the modification to change the gradation of the reference barcode, the modification to partially damage the reference barcode, the modification to add a specific image to the reference barcode, or the modification to change the uniformity of the lines of the reference barcode. In the first specific example, when the variable N is 1, on the basis of the table 79 illustrated in FIG. 5, the control portion 30 acquires, as the modification factor, "gradation defect" corresponding to 1 in the reading order. The control portion 30 generates the judgment image data by applying, to the reference image data acquired at S1, the modification to change the gradation of the one-dimensional barcode 66, and acquires the generated judgment image data.

When the reference barcode is the two-dimensional code, the control portion 30 acquires the judgment image data by applying, to the reference image data, one of the modification to change the gradation of the reference barcode, the modification to partially damage the reference barcode, the modification to add a specific image to the reference barcode, or the modification to cause the position of the reference barcode to be displaced. In the second specific example, when the variable N is 1, on the basis of the table 79 illustrated in FIG. 5, the control portion 30 acquires, as the modification factor, "gradation defect" corresponding to 1 in the reading order. The control portion 30 generates the judgment image data by applying, to the reference image data acquired at S1, the modification to change the gradation of the two-dimensional code 96, and acquires the generated judgment image data. The control portion 30 of the present embodiment modifies the two-dimensional code 96, and does not modify the character strings 97 and 98.

After controlling the conveyance drive portions 9, 11, 38, 39, and 49 and conveying the medium M in the return direction B, the control portion 30 prints a judgment image on the medium M, on the basis of the judgment image data acquired at S7 (S8). In the first specific example when the variable N is 1, the control portion 30 prints a judgment image 61 on the label M2, on the basis of the judgment image data acquired at S7. In the second specific example when the variable N is 1, the control portion 30 prints a judgment image 91 on the label M2, on the basis of the judgment image data acquired at S7. The control portion 30 controls the conveyance drive portions 9, 11, 38, 39, and 49, conveys the label M2 on which the judgment image has been printed to a position below the reading portion 45, and acquires read judgment image data output as a result of the judgment image being read by the reading portion 45 (S10).

The control portion 30 judges whether the read judgment image data acquired at S10 satisfies the predetermined standard, and stores the judgment result in association with the variable N (S11). In a similar manner to S4, the control portion 30 judges whether the predetermined standard is satisfied, in accordance with the type of the reference barcode, for each of the judgment items stored in the table 79 illustrated in FIG. 5. When the reference barcode is the one-dimensional barcode, when the print quality of the read judgment image data of the judgment image to which the modification "gradation defect" corresponding to 1 in the reading order is applied as the modification factor is appropriately judged, the predetermined standard is not satisfied for the symbol contrast and the minimum reflectance, and thus the NG judgment is issued. When the print quality of the read judgment image data of the judgment image to which the modification "addition of partial damage/contamination" corresponding to 2 in the reading order is applied as the modification factor is appropriately judged, the predetermined standard is not satisfied for the minimum edge contrast, the modulation, and the defect, and thus the NG judgment is issued. When the print quality of the read judgment image data of the judgment image to which the modification "addition of line non-uniformity" corresponding to 3 in the reading order is applied as the modification factor is appropriately judged, the predetermined standard is not satisfied for the ease of decoding, and thus the NG judgment is issued.

When the reference barcode is the two-dimensional code, when the print quality of the read judgment image data of the judgment image to which the modification "gradation defect" corresponding to 1 in the reading order is applied as the modification factor is appropriately judged, the predetermined standard is not satisfied for the symbol contrast, and thus the NG judgment is issued. When the print quality of the read judgment image data of the judgment image to which the modification "partial damage/contamination addition" corresponding to 2 in the reading order is applied as the modification factor is appropriately judged, the predetermined standard is not satisfied for the modulation, the reflectance margin, and the fixed pattern damage, and thus the NG judgment is issued. When the print quality of the read judgment image data of the judgment image to which the modification "addition of positional displacement" corresponding to 3 in the reading order is applied as the modification factor is appropriately judged, the predetermined standard is not satisfied for the non-uniformity of axes and the non-uniformity of lattice, and thus the NG judgment is issued. The not yet used error correction is judged when taking "gradation defect," "addition of partial damage/contamination," and "addition of positional displacement" into consideration as a whole.

The control portion 30 determines whether the variable N is the number of the modification factors (S14). The number of modification factors of the present examples is 3, regardless of the type of barcode. When the variable N is not the number of the modification factors (no at S14), the control portion 30 increments the variable N by 1 (S13), and returns the processing to S7. In the first specific example, when the variable N is 2, the modification factor is "addition of partial damage/contamination" corresponding to 2 in the reading order, and the control portion 30 acquires the judgment image data by applying, to the reference image data acquired at S1, the modification to add a specific image 67 to the one-dimensional barcode 66 (S7). The shape, size, arrangement and the like of the specific image 67 are set as appropriate. The specific image 67 is an oval having a diameter greater than a thickness of the thickest line included in the one-dimensional barcode 66. The control portion 30 prints a judgment image 62 on the basis of the judgment image data (S8), and judges the print quality of the read judgment image data of the printed judgment image 62 (S10, S11). In the first specific example, when the variable N is 3, the modification factor is "addition of line non-uniformity" corresponding to 3 in the reading order, and the control portion 30 acquires the judgment image data by applying, to the reference image data acquired at S1, the modification to change the thickness of the lines of the one-dimensional barcode 66 through application of a scaling algorithm (S7). The control portion 30 partially applies the modification to change the thickness of the lines to the one-dimensional barcode 66, and performs the modification to narrow the thickness of the line that is second from the right. The control portion 30 prints a judgment image 63 on the basis of the judgment image data (S8), and judges the print quality of the read judgment image data of the printed judgment image 63 (S10, S11).

In the second specific example, when the variable N is 2, the modification factor is "addition of partial damage/contamination" corresponding to 2 in the reading order, and the control portion 30 acquires the judgment image data by applying, to the reference image data acquired at S1, the modification to partially damage the two-dimensional code 96 (S7). The control portion 30 of the present example acquires the judgment image data in which a right central portion of the two-dimensional code 96 has been partially damaged. The control portion 30 prints a judgment image 92 on the basis of the judgment image data (S8), and judges the print quality of the read judgment image data of the printed judgment image 92 (S10, S11). In the second specific example, when the variable N is 3, the modification factor is "addition of positional displacement" corresponding to 3 in the reading order, and the control portion 30 acquires the judgment image data by applying, to the reference image data acquired at S1, the modification to change a magnification of the two-dimensional code 96 in a specific direction (S7). The control portion 30 of the present example acquires the judgment image data in which the two-dimensional code 96 has been enlarged in the conveyance direction F. The control portion 30 prints a judgment image 93 on the basis of the judgment image data (S8), and judges the print quality of the read judgment image data of the printed judgment image 93 (S10, S11).

When the variable N is the number 3 that is the number of the modification factors (yes at S14), the control portion 30 determines whether the judgment results at S11 associated with the variables N are all the NG judgment (S15). When the judgment at S11 has been appropriately performed, the NG judgment is issued for the respective judgment results of the print quality of the read judgment image data, due to the modification factors. Thus, when the judgment results at S11 are all the NG judgment (yes at S15), as processing to notify the judgment result of the print quality of the barcode, the control portion 30 displays "Print quality judgment normal" on the display portion 3 (S16), and subsequently performs the normal print processing on the basis of the print data (S17). In this way, without increasing a burden on the user, in addition to a first perspective of being able to issue the OK judgment for the read image data that satisfies the predetermined standard, from a second perspective also of being able to issue the NG judgment for the read image data that does not satisfy the predetermined standard, the print device 1 can notify the user that the judgment of the print quality is being appropriately performed. On the basis of a notification result, the user can determine that the print device 1 can appropriately judge the print quality from both the first perspective and the second perspective, and can determine that the OK judgment is not a mistaken judgment by the print device 1 and is a result judged based on the fact that the read image data satisfies the predetermined standard.

On the other hand, when the OK judgment is issued for the read judgment image data at S11, this indicates a case in which the control portion 30 cannot appropriately judge the print quality of the read judgment image data. Thus, when at least one of the judgment results at S11 is not the NG judgment (no at S15), as processing to notify an error in the judgment results of the print quality of the barcode, the control portion 30 displays "Print quality judgment abnormal" on the display portion 3 (S18). On the basis of the notification result, the user can determine that the print device 1 cannot appropriately judge the print quality of the read image data. After S17 or S18, the control portion 30 ends the print quality judgment processing.

Figure 8:
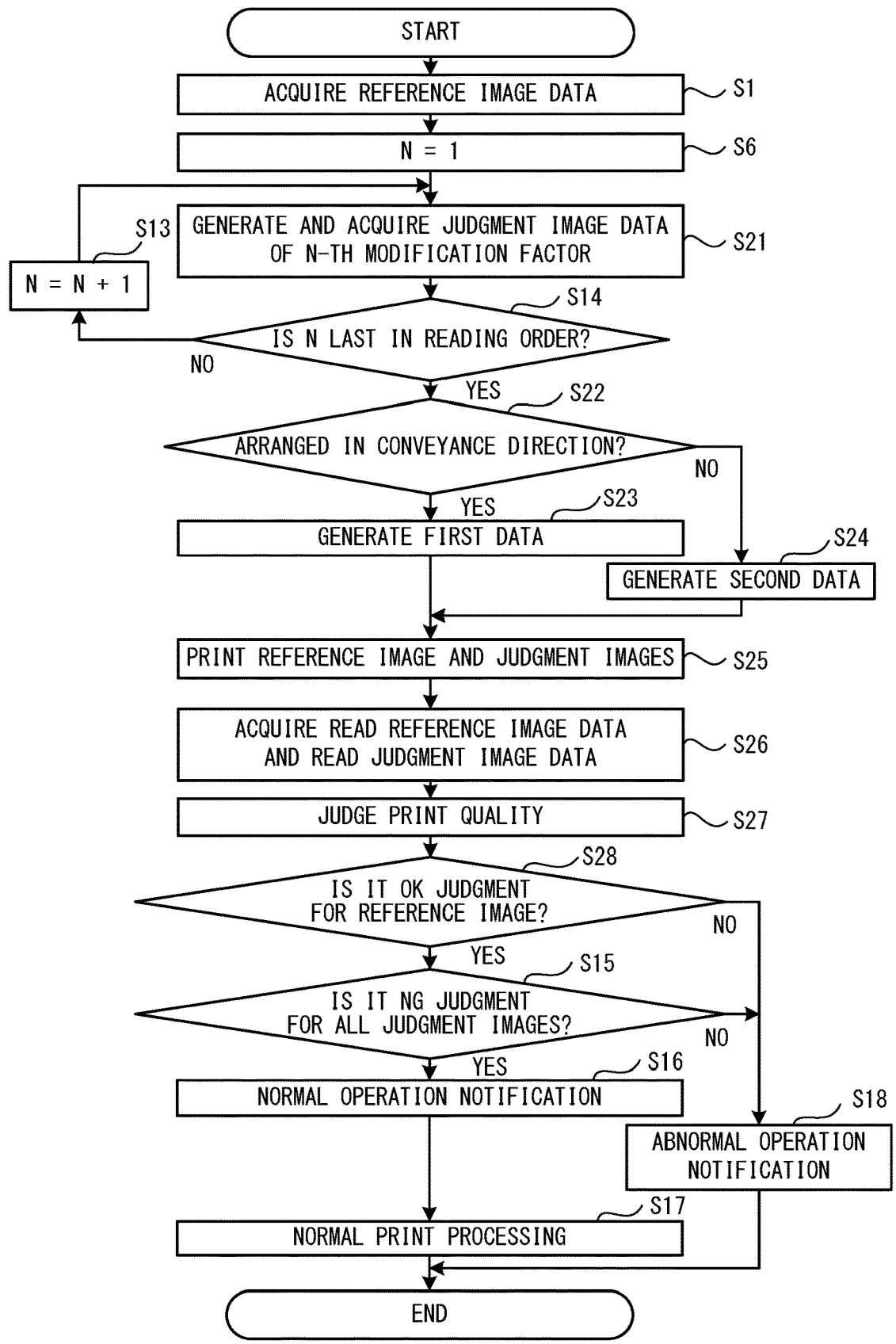
FIG. 8 is a flowchart of the print quality judgment processing of a modified example.
Figure 9:
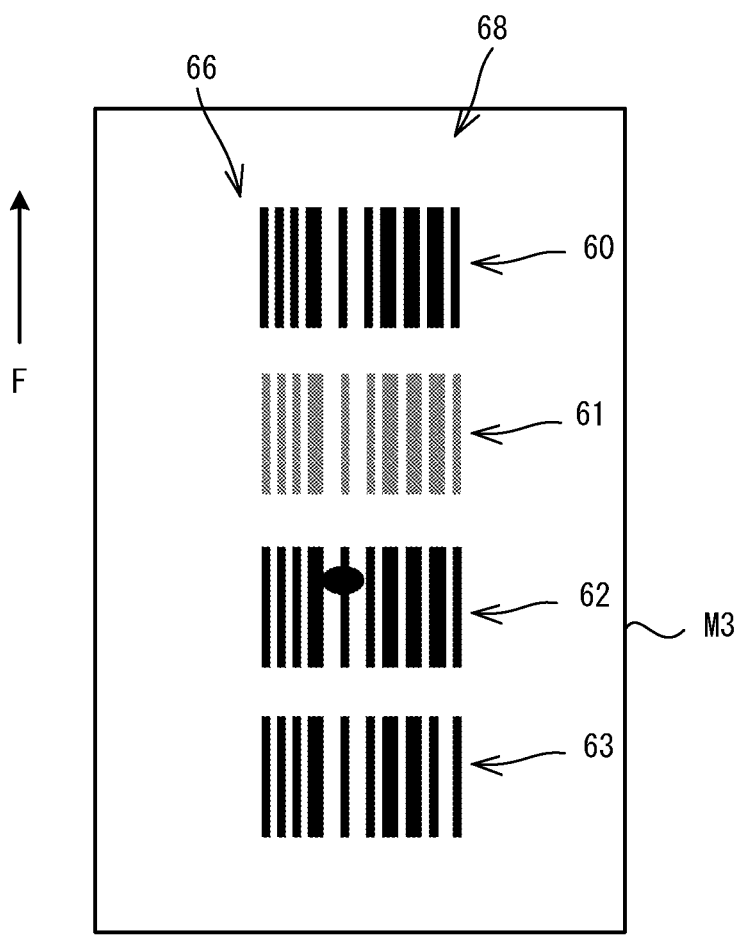
FIG. 9 is an explanatory diagram of an image printed on the basis of first data of a third specific example.
Figure 10:
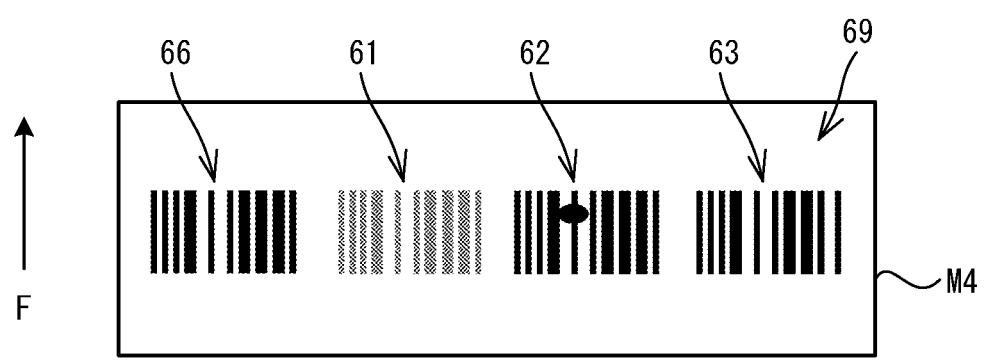
FIG. 10 is an explanatory diagram of an image printed on the basis of second data of a fourth specific example.

The print quality judgment processing of a modified example relating to specific examples 3 and 4 will be described with reference to FIG. 8 to FIG. 10. In FIG. 8, the same step numbers are assigned to the processing that is the same as that of the print quality judgment processing illustrated in FIG. 6. As illustrated in FIG. 8, the print quality judgment processing of the modified example and the print quality judgment processing illustrated in FIG. 6 differ from each other in that, in the print quality judgment processing of the modified example, the processing from S2 to S5 is omitted, processing at S21 is performed between S6 and S14, and processing at S22 to S28 is performed between S14 and S15. Hereinafter, a description of the processing that is the same as that of the print quality judgment processing illustrated in FIG. 6 will be omitted or simplified, and the processing that is different from that of the print quality judgment processing illustrated in FIG. 6 will be described. The third specific example is a case in which, on the basis of the reference image data of the same one-dimensional barcode 66 as in the first specific example, the reference image 60 and the judgment images 61 to 63 are arranged in the conveyance direction F and printed on a label M3, and the print quality is judged. The fourth specific example is a case in which, on the basis of the reference image data of the same one-dimensional barcode 66 as in the first specific example, the reference image 60 and the judgment images 61 to 63 are arranged in the width direction orthogonal to the conveyance direction F and printed on a label M4, and the print quality is judged.

At S21 of the print quality judgment processing illustrated in FIG. 8, in a similar manner to the processing at S7 illustrated in FIG. 6, the control portion 30 applies the modification of the N-th modification factor to the reference image data acquired at S1, generates the judgment image data, and stores the generated judgment image data in the storage portion 31 (S21). In the third and fourth specific examples, the judgment image data of the judgment images 61 to 63 is acquired in order. At S22, it is determined whether to arrange the reference image and the judgment images in the conveyance direction F (S22). When using the label whose lengthwise direction is the conveyance direction F, as with the label M3 illustrated in FIG. 9, the control portion 30 determines the arrangement to be in the conveyance direction F, and when using the label whose lengthwise direction is the direction orthogonal to the conveyance direction F, as with the label M4 illustrated in FIG. 10, the control portion 30 determines the arrangement not to be in the conveyance direction F.

When the reference image and the judgment images are arranged in the conveyance direction F (yes at S22), the control portion 30 generates first data to print the one or more judgment images and the reference image of the reference barcode alongside each other in the conveyance direction F (S23). In the third specific example, as illustrated in FIG. 9, the control portion 30 generates the first data to print the reference image 60 of the one-dimensional barcode 66, and the judgment images 61 to 63 alongside each other in the conveyance direction F. The control portion 30 enlarges or reduces the images 60 to 63 in accordance with the size of the label M3. When the reference image and the judgment images are not arranged in the conveyance direction F (no at S22), the control portion 30 generates second data to print the one or more judgment images and the reference image of the reference barcode alongside each other in the width direction that is perpendicular to the conveyance direction F (S24). In the fourth specific example, as illustrated in FIG. 10, the control portion 30 generates the second data to print the reference image 60 of the one-dimensional barcode 66, and the judgment images 61 to 63 alongside each other in the left-right direction. The control portion 30 enlarges or reduces the images 60 to 63 in accordance with the size of the label M4.

On the basis of the first data generated at S23, or the second data generated at S24, the control portion 30 prints the reference image and the judgment images on the medium M (S25). In the third specific example, as illustrated in FIG. 9, an image 68 including the images 60 to 63 is printed on the label M3, and in the fourth specific example, as illustrated in FIG. 10, an image 69 including the images 60 to 63 is printed on the label M4. The control portion 30 controls the conveyance drive portions 9, 11, 38, 39, and 49, conveys the label M2 on which the judgment image has been printed to the position below the reading portion 45, and acquires the read reference image data and the read judgment image data output as a result of the image 68 being read by the reading portion 45 (S26). In the third specific example, of the image 68, the control portion 30 acquires the data output as a result of reading the image 60, as the read reference image data. Of the image 68, the control portion 30 acquires the data output as a result of reading each of the images 61 to 63, as the read judgment image data. In the fourth specific example, of the image 69, the control portion 30 acquires the data output as a result of reading the image 60, as the read reference image data. Of the image 69, the control portion 30 acquires the data output as a result of reading each of the images 61 to 63, as the read judgment image data.

In a similar manner to the processing at S4, the control portion 30 judges whether the read judgment image data acquired at S26 satisfies the predetermined standard, and in a similar manner to the processing at S11, judges whether the read reference image data satisfies the predetermined standard (S27). In a similar manner to the processing at S5, the control portion 30 determines whether the judgment result of the read reference image data at S27 is the OK judgment (S28). When the judgment result of the read reference image data is the OK judgment (yes at S28), in a similar manner to the processing at S5, the control portion 30 determines whether the judgment results of the read judgment image data at S27 are all the NG judgment (S15). When the judgment results of the read judgment image data are all the NG judgment (yes at S15), after notifying normal operation (S16), the control portion 30 performs the normal print processing (S17), and then ends the print quality judgment processing. In this way, without increasing the burden on the user, in addition to the first perspective of being able to issue the OK judgment for the read image data that satisfies the predetermined standard, from the second perspective also of being able to issue the NG judgment for the read image data that does not satisfy the predetermined standard, the print device 1 of the modified example can notify the user that the judgment of the print quality is being appropriately performed. On the basis of a notification result, the user can determine that the print device 1 can appropriately judge the print quality from both the first perspective and the second perspective, and can determine that the OK judgment is not a mistaken judgment by the print device 1 and is a result judged based on the fact that the read image data satisfies the predetermined standard. When the judgment result of the read reference image data is not the OK judgment (no at S27), or when at least one of the judgment results of the read judgment image data is not the NG judgment (no at S15), the control portion 30 performs error notification (S18). In this way, on the basis of the notification result, the user can determine that the print device 1 has not been able to appropriately judge the print quality of the read image data. Following S17 or S18, the control portion 30 ends the print quality judgment processing of the modified example.

Figure 11:
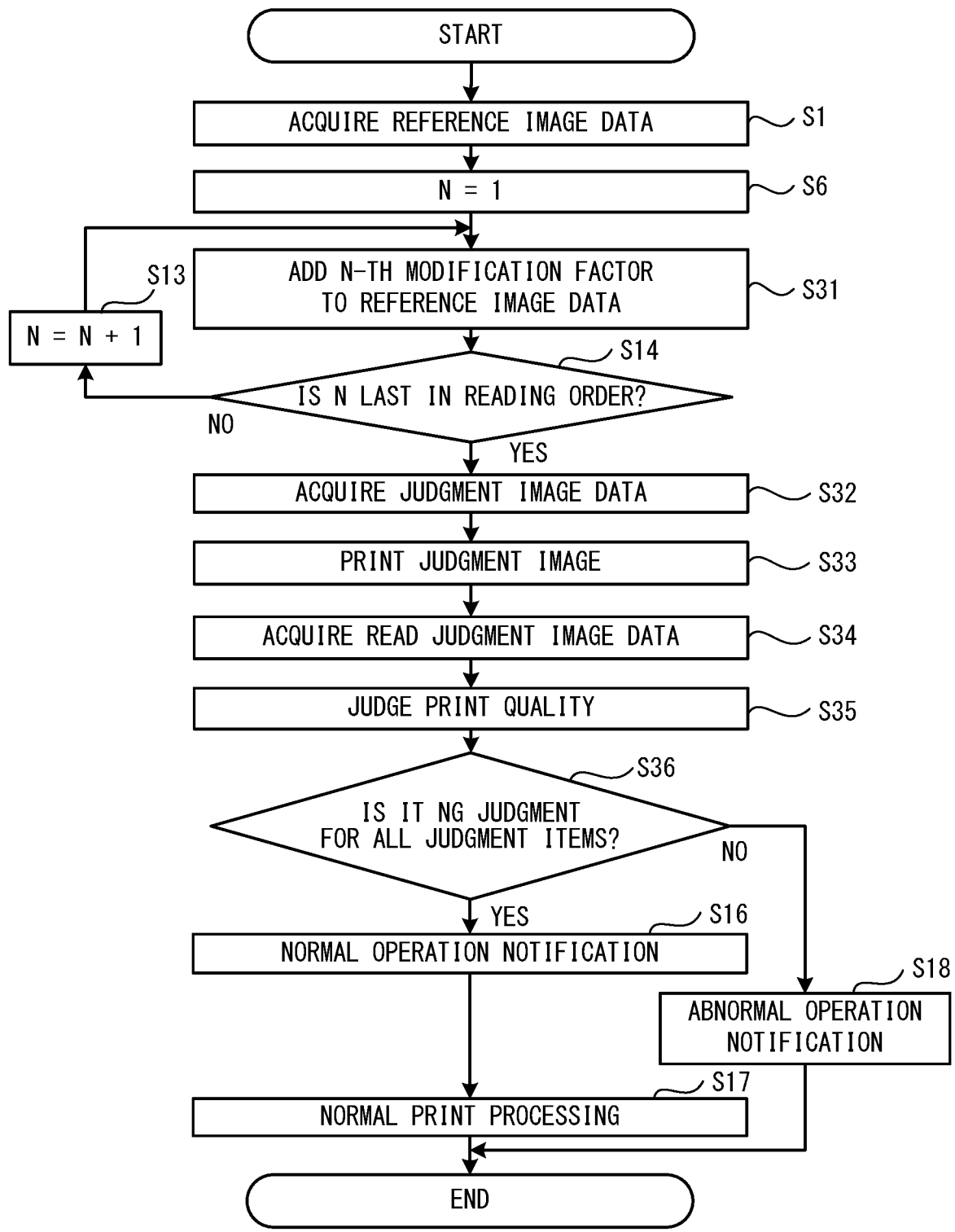
FIG. 11 is a flowchart of the print quality judgment processing of a modified example.
Figure 12:
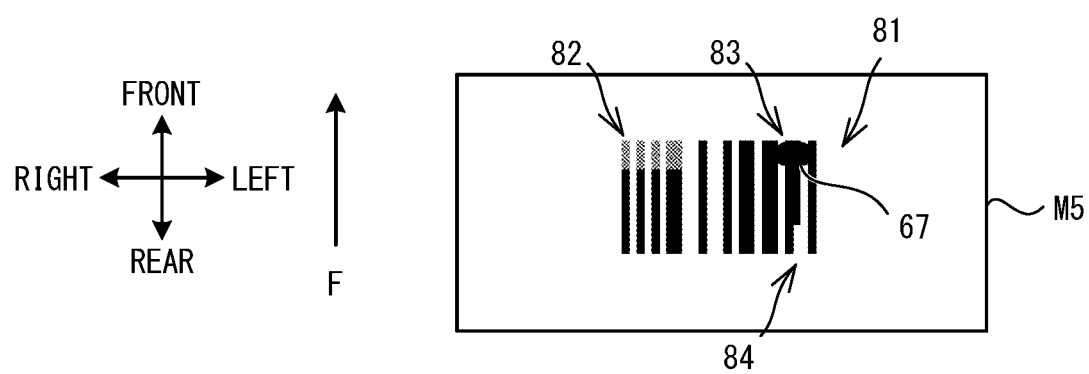
FIG. 12 is an explanatory diagram of a judgment image of a fifth specific example.

The print quality judgment processing of a modified example relating to a fifth specific example will be described with reference to FIG. 11 and FIG. 12. In FIG. 11, the same step numbers are assigned to the processing that is the same as that of the print quality judgment processing illustrated in FIG. 6. As illustrated in FIG. 11, the print quality judgment processing of the modified example and the print quality judgment processing illustrated in FIG. 6 differ from each other in that, in the print quality judgment processing of the modified example, the processing from S2 to S5 is omitted, processing at S31 is performed between S6 and S14, and processing at S32 to S36 is performed between S14 and S16. Hereinafter, a description of the processing that is the same as that of the print quality judgment processing illustrated in FIG. 6 will be omitted or simplified, and the processing that is different from that of the print quality judgment processing illustrated in FIG. 6 will be described. The fifth specific example is a case in which, on the basis of the reference image data of the same one-dimensional barcode 66 as in the first specific example, the judgment image data of a judgment image 81 illustrated in FIG. 12 is acquired, the judgment image 81 is printed on a label M5, and the print quality is judged.

At S31 of the print quality judgment processing illustrated in FIG. 11, with respect to the reference image data acquired at S1, the control portion 30 attributes the N-th modification factor to an N-th modification location (S31). The corner portions of the reference barcode are allocated, in a predetermined order, to the N-th modification location. For example, the control portion 30 allocates the N-th modification location in the order of the front right corner portion, the front left corner portion, the rear left corner portion, and the rear right corner portion of the reference barcode. In the fifth specific example, when the variable N is 1, a gradation modification 82 is added to the front right corner portion of the one-dimensional barcode 66 illustrated in FIG. 4, when the variable N is 2, a modification 83 that adds the specific image 67 is added to the front left corner portion of the one-dimensional barcode 66, and when the variable N is 3, a modification 84 that changes the thickness of the line is added to the rear left corner portion of the one-dimensional barcode 66.

At S32, the control portion 30 generates the judgment image data to which the modification factor has been added at S31, and acquires the generated judgment image data (S32). In a similar manner to S8 illustrated in FIG. 6, the control portion 30 prints the judgment image 81 on the basis of the judgment image data acquired at S32 (S33). In a similar manner to S10, the control portion 30 acquires the read judgment image data of the judgment image 81 (S34). The control portion 30 determines whether the read judgment image data acquired at S34 satisfies the predetermined standard (S35). The control portion 30 determines whether the judgment results of the read judgment image data are the NG judgment for all of the judgment items stored in the table 79 illustrated in FIG. 5 (S36). When the judgment results of the read judgment image data are the NG judgment for all of the items (yes at S36), after notifying the normal operation (S16), the control portion 30 performs the normal print processing (S17), and then ends the print quality judgment processing. In this way, without increasing the burden on the user, from the perspective of being able to issue the NG judgment for the read image data that does not satisfy the predetermined standard, the print device 1 of the modified example can notify the user that the judgment of the print quality is being appropriately performed. When, in the judgment results of the read judgment image data, the OK judgment is issued for one or more of the items (no at S36), the control portion 30 performs the error notification (S18). On the basis of the notification result, the user can determine that the print device 1 has not been able to appropriately judge the print quality of the read image data. Following S17 or S18, the control portion 30 ends the print quality judgment processing.

The print device 1 of the above-described embodiment is provided with the supply portion 5, the print portion 6, the conveyance portions 7, 10, 15, 19. and 48, the display portion 3, the control portion 30, and the reading portion 45. The supply portion 5 supplies the long medium M. The print portion 6 prints the image on the medium M fed out from the supply portion 5. The conveyance portions 7, 10, 15, 19. and 48 convey the medium M in the conveyance direction F from the supply portion 5 toward the print portion 6. The control portion 30 controls the print portion 6, and the display portion 3. The reading portion 45 reads the image printed by the print portion 6, and outputs the read image data to the control portion 30. The control portion 30 acquires the judgment image data that does not satisfy the predetermined standard and that is used in the judgement of the print quality of the barcode (S7, S21, and S32). The control portion 30 controls the print portion 6, and, on the basis of the judgment image data, prints the judgment image on the medium M (S8, S25, and S33). The control portion 30 judges whether the read judgment image data output as a result of the judgment image being read by the reading portion 45 satisfies the predetermined standard (S11, S27, and S35). When it is judged that the read judgment image data satisfies the predetermined standard, the control portion 30 controls the display portion 3 and performs the error notification (S18). In order to appropriately judge the print quality, it is necessary for the print device 1 to be able to issue the NG judgment to the read image data that does not satisfy the predetermined standard. However, the known print device judges whether the judgement of the print quality is being appropriately performed from the perspective of whether or not the print device is able to issue the OK judgment to the read image data that satisfies the predetermined standard, and thus cannot detect when the OK judgment is mistakenly issued to the read image data for which the control portion 30 should essentially issue the NG judgment. In contrast to this, at S15, the print device 1 performs the processing to judge whether it is possible to issue the NG judgment to the read image data that does not satisfy the predetermined standard, and when it is judged that the read judgment image data satisfies the predetermined standard used in the judgment of the print quality of the barcode, this means that it is a case in which the NG judgment cannot be issued to the read image data that does not satisfy the predetermined standard, and the error notification is thus performed. Thus, on the basis of whether or not the print quality of the judgment image can be judged to be the NG judgment, the print device 1 contributes to notifying the user that the judgment of the print quality of the printed barcode is being appropriately performed.

By adding the specific image to the reference barcode, or by changing a specific value of the reference image data of the reference barcode, the control portion 30 of the print device 1 modifies the reference image data and acquires the judgment image data (S7, S21, and S32). On the basis of the judgment result of the print quality of the judgment image obtained by modifying the reference image data, by adding the specific image to the reference barcode, or by changing the specific value of the reference image data, the print device 1 contributes to notifying the user as to whether the judgment of the print quality is being appropriately performed.

The reference barcode includes the one-dimensional barcode, and the control portion 30 acquires the judgment image data by performing one of the modifications with respect to the reference image data, namely, one of the modification to change the gradation of the reference barcode, the modification to partially damage the reference barcode, the modification to add the specific image to the reference barcode, and the modification to change the uniformity of the lines of the reference barcode (S7, S21, and S32). On the basis of the judgment result of the print quality of the judgment image when the reference image data representing the one-dimensional barcode has been modified, the print device 1 contributes to notifying the user as to whether the judgment of the print quality is being appropriately performed.

The reference barcode includes the two-dimensional code, and the control portion 30 acquires the judgment image data by performing one of the modifications with respect to the reference image data, namely, one of the modification to change the gradation of the reference barcode, the modification to partially damage the reference barcode, the modification to add the specific image to the reference barcode, or the modification to cause the positional displacement of the reference barcode (S7, S21, and S32). On the basis of the judgment result of the print quality of the judgment image when the reference image data representing the two-dimensional code has been modified, the print device 1 contributes to notifying the user as to whether the judgment of the print quality is being appropriately performed.

The control portion 30 acquires the judgment image data by performing the modification, with respect to the reference image data, to add the specific image to the reference barcode (S7, S21, and S32). On the basis of the judgment result of the print quality of the judgment image obtained by adding the specific image to the reference barcode, the print device 1 contributes to notifying the user as to whether the judgment of the print quality is being appropriately performed.

When the barcode is the one-dimensional barcode or the two-dimensional code and the reading order is 1, the control portion 30 acquires the judgment image data by performing the modification, with respect to the reference image data, to change the gradation of the reference barcode (S7, S21, and S32). On the basis of the judgment result of the print quality of the judgment image obtained by changing the gradation of the reference barcode, the print device 1 contributes to notifying the user as to whether the judgment of the print quality is being appropriately performed.

When the barcode is the one-dimensional barcode or the two-dimensional code and the reading order is 2, the control portion 30 acquires the judgment image data by performing the modification, with respect to the reference image data, to cause the reference barcode to be partially damaged (S7, S21, and S32). On the basis of the judgment result of the print quality of the judgment image obtained by causing the reference barcode to be partially damaged, the print device 1 contributes to notifying the user as to whether the judgment of the print quality is being appropriately performed.

When the barcode is the one-dimensional barcode and the reading order is 3, the control portion 30 acquires the judgment image data by performing the modification to change the thickness of the line of the reference barcode, by applying the scaling algorithm to the reference image data (S7, S21, and S32). On the basis of the judgment result of the print quality of the judgment image obtained by changing the thickness of the line of the reference barcode, the print device 1 contributes to notifying the user as to whether the judgment of the print quality is being appropriately performed.

When the barcode is the two-dimensional code and the reading order is 3, the control portion 30 acquires the judgment image data by performing the modification, with respect to the reference image data, to change the magnification of the reference barcode in the specific direction (S7, S21, and S32). On the basis of the judgment result of the print quality of the judgment image obtained by changing the magnification of the reference barcode in the specific direction, the print device 1 contributes to notifying the user as to whether the judgment of the print quality is being appropriately performed.

The control portion 30 generates the first data to print the one or more judgment images and the reference image of the reference barcode alongside each other in the conveyance direction F (S23). The control portion 30 controls the print portion 6 and, on the basis of the first data, prints the reference image and the one or more judgment images on the medium M (S25), judges whether the read judgment image data of each of the one or more judgment images satisfies the predetermined standard, and judges whether the read reference image data output as a result of the reference image being read by the reading portion 45 satisfies the predetermined standard (S27). When it is judged, at S27, that the read judgment image data satisfies the predetermined standard (no at S15), or when it is judged, at S27, that the read reference image data does not satisfy the predetermined standard (no at S28), the control portion 30 controls the display portion 3 as a notification portion, and performs the error notification (S18). On the basis of the judgment result of the print quality of the reference image and the one or more judgment images printed based on the first data, the print device 1 can notify the user as to whether the judgment of the print quality is being performed appropriately. Without increasing a burden on the user, in addition to the first perspective of being able to issue the OK judgment for the read image data that satisfies the predetermined standard, from the second perspective also of being able to issue the NG judgment for the read image data that does not satisfy the predetermined standard, the print device 1 contributes to notifying the user that the judgment of the print quality is being appropriately performed. On the basis of the notification result, the user can determine that the print device 1 can appropriately judge the print quality from both the first perspective and the second perspective, and can determine that the OK judgment is not a mistaken judgment by the print device 1 and is a result judged based on the fact that the read image data satisfies the predetermined standard.

The control portion 30 acquires the judgment image data by performing the plurality of types of modifications with respect to the reference image data (S31 and S32). On the basis of the judgment result of the print quality of the judgement image obtained by performing the plurality of types of modification, the print device 1 contributes to notifying the user that the judgment of the print quality is being performed appropriately. Compared to a case in which the plurality of judgment images are generated for each of the modifications and the print quality is judged, the print device 1 contributes to reducing a number of print copies of the judgment image, and to reducing the time required for the judgment of the print quality.

The control portion 30 generates the second data to print the one or more judgment images and the reference image of the reference barcode alongside each other in the width direction that is perpendicular to the conveyance direction F (S24). The control portion 30 controls the print portion 6 and, on the basis of the second data, prints the reference image and the one or more judgment images on the medium M (S25), judges whether the read judgment image data of each of the one or more judgment images satisfies the predetermined standard, and judges whether the read reference image data output as a result of the reference image being read by the reading portion 45 satisfies the predetermined standard (S27). When it is judged, at S27, that the read judgment image data satisfies the predetermined standard (no at S15), or when it is judged, at S27, that the read reference image data does not satisfy the predetermined standard (no at S28), the control portion 30 controls the display portion 3 as the notification portion, and performs the error notification. On the basis of the judgment result of the print quality of the reference image and the one or more judgment images printed based on the second data, the print device 1 can notify the user as to whether the judgment of the print quality is being performed appropriately. Without increasing a burden on the user, in addition to the first perspective of being able to issue the OK judgment for the read image data that satisfies the predetermined standard, from the second perspective also of being able to issue the NG judgment for the read image data that does not satisfy the predetermined standard, the print device 1 contributes to notifying the user that the judgment of the print quality is being appropriately performed. On the basis of the notification result, the user can determine that the print device 1 can appropriately judge the print quality from both the first perspective and the second perspective, and can determine that the OK judgment is not a mistaken judgment by the print device 1 and is a result judged based on the fact that the read image data satisfies the predetermined standard.

The control portion 30 acquires the judgment image data stored in advance. The print device 1 does not need to perform the processing to generate the judgment image data, and can simplify the processing up to the printing of the judgment image.

The notification portion is the display portion 3, and the control portion 30 controls the display portion 3 as the notification portion and performs the error notification. When it is determined that the read judgment image data satisfies the predetermined standard, the print device 1 contributes to displaying the error by controlling the display portion 3 as the notification portion.

The supply portion 5 supplies the medium M from the roll R around which the medium M is wound. Each of the conveyance portions 7, 10, 15, 19, and 48 is the belt or the roller that conveys the medium M. The print portion 6 includes the inkjet head and prints the image on the medium M by discharging the liquid from the inkjet head. When it is judged that the print quality satisfies the predetermined standard when the judgment image is printed using the inkjet method on the medium M wound into the roll shape, the print device 1 contributes to displaying the error by controlling the display portion 3 as the notification portion.

The print device, the print quality judgment method, and the non-transitory computer-readable storage medium of the present disclosure are not limited to the above-described embodiment, and various modifications may be made without departing from the broad spirit and scope of the present disclosure. For example, the following modifications may be added as appropriate.

It is sufficient that the supply portion 5 be able to supply the long medium M, and a configuration of the supply portion 5 may be changed as appropriate. The medium M may be fan-fold paper that is folded along perforations cut into a sheet. The conveyance portion 7 may convey the medium M using another conveyance member, such as a conveyance belt or the like. The conveyance portion 10 may be configured to be able to convey the medium M in the return direction B, the configuration of the conveyance portion 10 may be changed in accordance with the configuration of the supply portion 5, or the conveyance portion 10 may be omitted. The notification portion may be an audio output portion, such as a speaker, and it is sufficient that a notification control portion perform the error notification in a mode that accords with the configuration of the notification portion.

The configuration of the print portion 6 may be changed as appropriate, and the print portion 6 may be an inkjet head that can perform color printing, or may be a thermal head using an electrophotographic method or a thermal method. Depending on the printing method of the print device 1, the fixing unit 40 may be omitted, or the configuration of the fixing unit 40 may be changed. The cutting portion 50 may be omitted from the print device 1. The cutting portion 50 may cut the medium M using a manual method by the user. At least one selected from the group of the conveyance portions 15, 19, and 48 may be omitted as necessary, and the configurations thereof may be changed. The reading portion 45 may be another device, for example, such as a charge coupled device (CCD) or the like.

The program including the instructions to execute the print quality judgment processing shown in FIG. 6 may be stored in a storage device of the print device 1 until the program is executed by the control portion 30. Thus, a program acquisition method, an acquisition path, and a device storing the program may be changed, respectively, as appropriate. The program executed by the control portion 30 may be received from another device via cable or wireless communication, and may be stored in a storage device, such as a flash memory or the like. The other device includes a PC, and a server connected via a network, for example.

Each of the steps of the print quality judgment processing of the print device 1 is not limited to the example of being executed by the control portion 30, and part or all of the processing may be executed by another electronic device (an ASIC, for example). Each of the steps of the main processing may be executed by distributed processing by a plurality of electronic devices (a plurality of CPUs, for example). The order of each of the steps of the main processing may be changed, the step may be omitted, or a step may be added, as necessary. A mode in which part or all of the main processing is executed by an operating system (OS) or the like operated on the print device 1 on the basis of instructions from the control portion 30 is also included in the scope of the present disclosure. For example, the following changes may be added to the print quality judgment processing as appropriate.

The judgment items of the print quality, and the content, number and type of the modification factors, and the like may be changed as appropriate. The modification factors when the barcode is the one-dimensional barcode may be one or more factors selected from among the gradation defect, the addition of partial damage or contamination, and the addition of the line non-uniformity, or may be a factor other than the 3 factors. In a similar manner, the modification factors when the barcode is the two-dimensional code may be one or more factors selected from among the gradation defect, the addition of partial damage or contamination, and the addition of the positional displacement, or may be a factor other than the 3 factors. The print device 1 may set the same modification factors regardless of the type of the barcode. The reference barcode may include one of the one-dimensional barcode or the two-dimensional code, and need not necessarily include the characters, graphics and the like. When the judgment image data is stored, the control portion 30 may omit the processing to acquire the reference image data, and the processing to modify the reference image data and generate the judgment image data. When the print device 1 performs the processing to acquire the reference image data and the processing to modify the reference image data and generate the judgment image data, the judgment image data need not necessarily be stored in advance. The processing to modify the reference image data and generate the judgment image data may be changed as appropriate depending on the modification factor. The control portion 30 may generate the judgment image data that has been modified using the modification factor specified by the user, of the plurality of modification factors, and acquire the judgment image data. When the judgment images and the reference image of the reference barcode are printed alongside each other, an arrangement of each of the images may be changed as appropriate. For example, the control portion 30 may arrange the judgment images and the reference image in a matrix shape of a predetermined number of rows and a predetermined number of columns.

At S24, when the barcode is the one-dimensional barcode, the control portion 30 may arrange the judgment images and the reference image such that an orientation of the lines of the judgment images and the reference image is the width direction orthogonal to the conveyance direction F. At at least one selected from the group of S4, S11, S27, and S35, the control portion 30 may store the OK judgment when each of the judgment items satisfies the predetermined standard, and may store the NG judgment when each of the judgment items does not satisfy the predetermined standard. At S18, the control portion 30 may perform notification as to whether it is the read reference image data or the read judgment image data that is the subject of the error judgment. When it is notified that the print quality of the read reference image data is judged to be normal, and the print quality of read judgment image data is judged to be abnormal, the user can identify that the print device 1 has mistakenly issued the OK judgment to the read image data for which the NG judgment should be issued. At S18, the control portion 30 may notify the judgment item that is subject to the error judgment. At S7, the control portion 30 may add the modification to the character strings 97 and 98 in a similar manner to the two-dimensional code 96. At S22, the control portion 30 may determine whether to arrange the images in the conveyance direction F on the basis of the absence or presence of a command from the user, or in accordance with attributes of the medium M. When the modification factor is "addition of line non-uniformity," at S7, the modification to change the thickness of the line or the like may be applied to the whole of the reference barcode, or may be partially applied to the reference barcode. At S23 or S24, the control portion 30 need not necessarily change the size of the reference image and the judgment images in accordance with the size of the label.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A print device comprising:
  a housing including a supply space, the supply space being configured to accommodate a medium;
  a print head configured to print an image on the medium fed out from the supply space;
  a conveyance portion, including a motor, configured to convey the medium in a conveyance direction from the supply space toward the print head;
  a processor configured to control the print head;
  an image reader configured to read the image printed by the print head and to output read image data to the processor; and
  a memory storing computer-readable instructions that, when executed by the processor, instruct the processor to perform processes comprising:
    acquisition processing of acquiring data, of a judgment image, that does not satisfy a predetermined standard used to judge a print quality of a barcode;
    print processing of controlling the print head, based on the data of the judgment image, to print the judgment image on the medium;
    judgment processing of judging whether read judgment image data output by the image reader as a result of reading the judgment image satisfies the predetermined standard; and
    notification processing of performing an error notification, when, in the judgment processing, it is judged that the read judgment image data satisfies the predetermined standard.

2. The print device according to claim 1, wherein
the acquisition processing includes adding a specific image to a reference barcode, or changing a specific value of reference image data of the reference barcode to modify the reference image data, to acquire the judgement image data.

3. The print device according to claim 2, wherein
the reference barcode includes a one-dimensional barcode, and
the acquisition processing includes acquiring the data of the judgment image by performing, with respect to the reference image data, one of a modification to change a gradation of the reference barcode, a modification to partially damage the reference barcode, a modification to add the specific image to the reference barcode, or a modification to change a line uniformity of the reference barcode.

4. The print device according to claim 2, wherein
the reference barcode includes a two-dimensional code, and
the acquisition processing includes acquiring the data of the judgment image by performing, with respect to the reference image data, one of a modification to change a gradation of the reference barcode, a modification to partially damage the reference barcode, a modification to add the specific image to the reference barcode, or a modification to cause a positional displacement of the reference barcode.

5. The print device according to claim 2, wherein
the acquisition processing includes acquiring the data of the judgment image by performing, with respect to the reference image data, a modification to add the specific image to the reference barcode.

6. The print device according to claim 2, wherein
the acquisition processing includes acquiring the data of the judgment image by performing, with respect to the reference image data, a modification to change a gradation of the reference barcode.

7. The print device according to claim 2, wherein
the acquisition processing includes acquiring the data of the judgment image by performing, with respect to the reference image data, a modification to partially damage the reference barcode.

8. The print device according to claim 2, wherein
the acquisition processing includes acquiring the data of the judgment image by performing a modification to change a thickness of a line of the reference barcode, by applying a scaling algorithm to the reference image data.

9. The print device according to claim 2, wherein
the acquisition processing includes acquiring the data of the judgment image by performing, with respect to the reference image data, a modification to change a magnification of the reference barcode in a specific direction.

10. The print device according to claim 2, wherein
the computer-readable instructions further instruct the processor to perform a process comprising:
first generation processing of generating first data to print one or more of the judgment images and a reference image of the reference barcode alongside each other in the conveyance direction,
the print processing includes controlling the print head and, based on the first data, to print the reference image and the one or more judgment images on the medium,
the judgment processing includes
judging whether the read judgment image data of each of the one or more judgment images satisfies the predetermined standard, and
judging whether read reference image data output by the image reader as a result of reading the reference image satisfies the predetermined standard, and
the notification processing includes performing the error notification when it is judged, in the judgment processing, that the read judgment image data satisfies the predetermined standard, or when it is judged, in the judgment processing, that the read reference image data does not satisfy the predetermined standard.

11. The print device according to claim 2, wherein
the acquisition processing includes acquiring the data of the judgment image by performing, with respect to the reference image data, a plurality of types of modification.

12. The print device according to claim 2, wherein
the computer-readable instructions further instruct the processor to perform a process comprising:
second generation processing of generating second data to print one or more of the judgment images and a reference image of the reference barcode alongside each other in a width direction perpendicular to the conveyance direction,
the print processing includes controlling the print head and, based on the second data, to print the reference image and the one or more judgment images on the medium,
the judgment processing includes
judging whether the read judgment image data of each of the one or more judgment images satisfies the predetermined standard, and
judging whether read reference image data output by the image reader as a result of reading the reference image satisfies the predetermined standard, and
the notification processing includes performing the error notification when it is judged, in the judgment processing, that the read judgment image data satisfies the predetermined standard, or when it is judged, in the judgment processing, that the read reference image data does not satisfy the predetermined standard.

13. The print device according to claim 1, wherein
the acquisition processing includes acquiring the data of the judgment image stored in advance.

14. The print device according to claim 1, further comprising:
a display connected to the processor, and
the notification processing includes controlling the display to display a message when the processor performs the error notification.

15. The print device according to claim 1, wherein
the supply space is configured to accommodate a medium roll around which the medium is wound,
the conveyance portion is a belt or a roller configured to convey the medium, and
the print head includes an inkjet head and prints the image on the medium by discharging a liquid from the inkjet head.

16. A print quality judgment method performed by a processor of a print device, the method comprising:
an acquisition process of acquiring data, of a judgment image, that does not satisfy a predetermined standard used to judge a print quality of a barcode printed by the print device, the print device including a housing, a print head, a conveyance portion, and an image reader, the housing including a supply space, the supply space being configured to accommodate a medium, the print head being configured to print an image on the medium fed out from the supply space, the conveyance portion, including a motor, being configured to convey the medium in a conveyance direction from the supply space toward the print head, and the image reader being configured to read the image printed by the print head and to output read image data to the processor;
a print process of controlling the print head, based on the data of the judgment image, to print the judgment image on the medium;
a judgment process of judging whether read judgment image data output by the image reader as a result of reading the judgment image satisfies the predetermined standard; and a notification process of performing an error notification, when, in the judgment process, it is judged that the read judgment image data satisfies the predetermined standard.

17. The print quality judgment method according to claim 16, wherein
the acquisition process includes adding a specific image to a reference barcode, or changing a specific value of reference image data of the reference barcode to modify the reference image data, to acquire the judgement image data.

18. A non-transitory computer-readable storage medium storing computer-readable instructions that are executed by a processor of a print device, the computer-readable instructions performing processes comprising:
acquisition processing of acquiring data, of a judgment image, that does not satisfy a predetermined standard used to judge a print quality of a barcode printed by the print device, the print device including a housing, a print head, a conveyance portion, and an image reader, the housing including a supply space, the supply space being configured to accommodate a medium, the print head being configured to print an image on the medium fed out from the supply space, the conveyance portion, including a motor, being configured to convey the medium in a conveyance direction from the supply space toward the print head, and the reader being configured to read the image printed by the print head and to output read image data to the processor;
print processing of controlling the print head, based on the data of the judgment image, to print a judgment image on the medium;
judgment processing of judging whether read judgment image data output by the image reader as a result of reading the judgment image satisfies the predetermined standard; and
notification processing of performing an error notification, when, in the judgment processing, it is judged that the read judgment image data satisfies the predetermined standard.

19. The non-transitory computer-readable storage medium according to claim 18, wherein
the acquisition processing includes adding a specific image to a reference barcode, or changing a specific value of reference image data of the reference barcode to modify the reference image data, to acquire the judgement image data.

* * * * *